United States Patent
Bowers et al.

[19]

[11] Patent Number: 6,155,597
[45] Date of Patent: Dec. 5, 2000

[54] VEHICLE OCCUPANT PROTECTION DEVICE WITH SPRING CONNECTOR

[75] Inventors: Paul A. Bowers, Ray; Daniel R. Sutherland, East Pointe, both of Mich.

[73] Assignee: TRW Vehicle Safety Systems Inc., Lyndhurst, Ohio

[21] Appl. No.: 09/309,954

[22] Filed: May 11, 1999

[51] Int. Cl.$^7$ ...................................................... B60R 21/22
[52] U.S. Cl. ...................................... 280/730.2; 280/728.2
[58] Field of Search .............................. 280/730.1, 730.2, 280/728.2, 749, 753, 748, 743.2

[56] References Cited

U.S. PATENT DOCUMENTS 5,322,322 6/1994 Bark et al. .
5,480,181 1/1996 Bark et al. .
5,788,270 8/1998 Haland et al. .

FOREIGN PATENT DOCUMENTS 29615485 2/1997 Germany .
29610920 10/1998 Germany .

Primary Examiner—Eric Culbreth
Attorney, Agent, or Firm—Tarolli, Sundheim, Covell, Tummino & Szabo L.L.P.

[57] ABSTRACT

A vehicle occupant protection device (14) has an inflated condition wherein the vehicle occupant protection device is located between a side structure (16) of the vehicle (12) and a vehicle occupant. When in the inflated condition, the vehicle occupant protection device (14) has a given length measured in the direction of vehicle travel. The length of the vehicle occupant protection device (14) increases as measured in the direction of vehicle travel as the vehicle occupant protection device deflates from the inflated condition to a deflated condition. A first spring connector (52) connects the vehicle occupant protection device (14) to the vehicle (12). The first spring connector (52) applies force to the vehicle occupant protection device (14) as it deflates and maintains tension in the deflating vehicle occupant protection device.

12 Claims, 2 Drawing Sheets

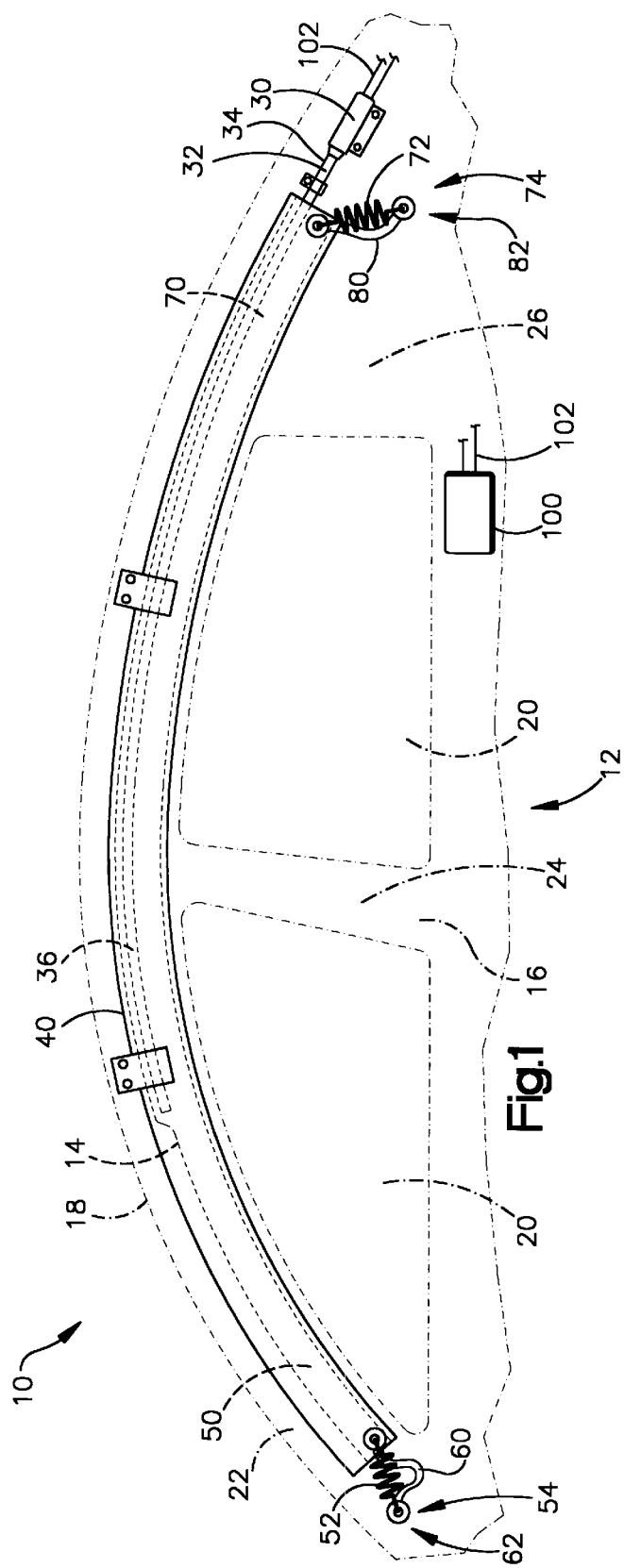

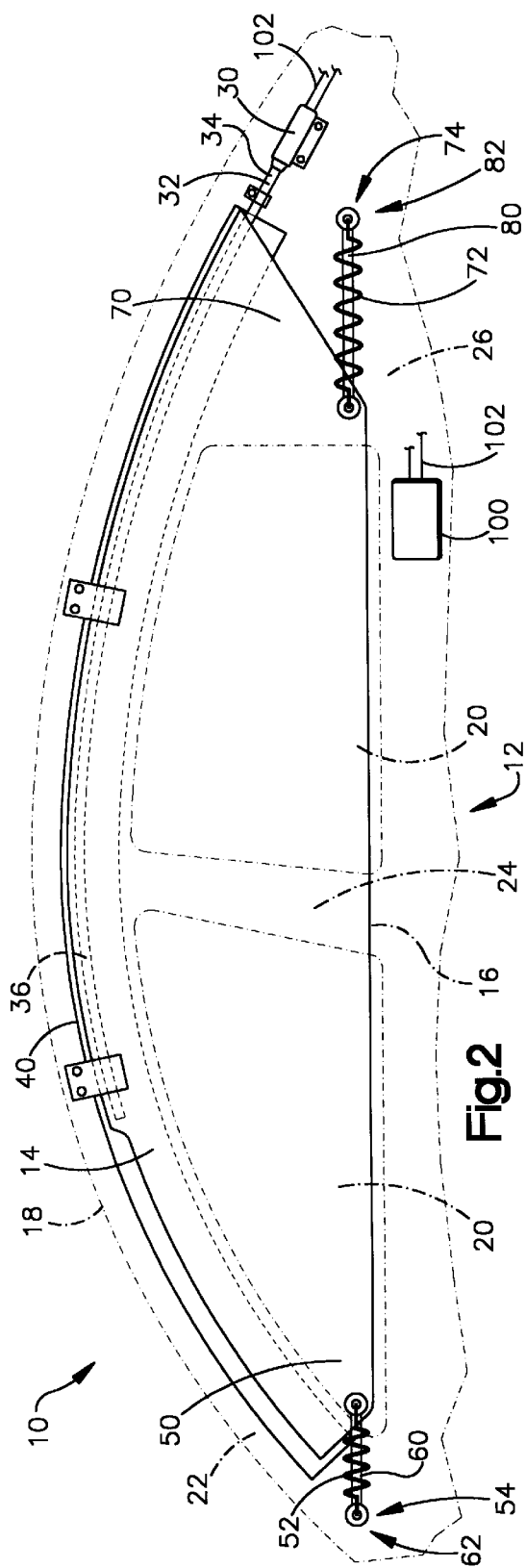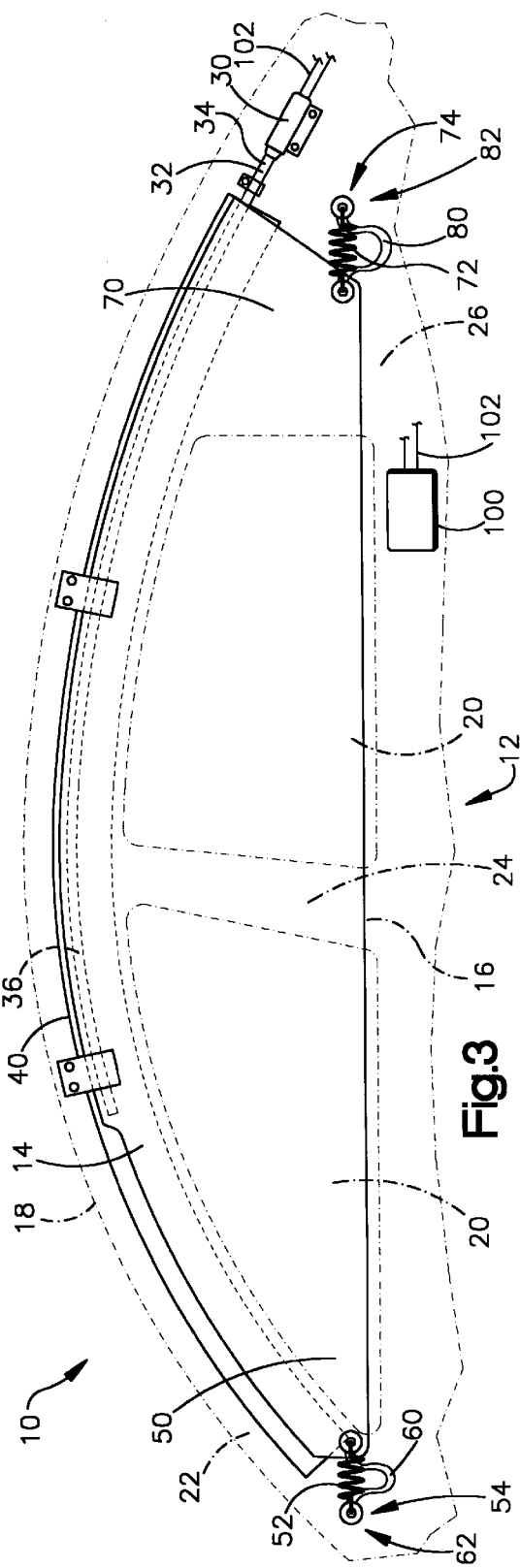

VEHICLE OCCUPANT PROTECTION DEVICE WITH SPRING CONNECTOR

FIELD OF THE INVENTION

The present invention relates to an inflatable vehicle occupant protection device for helping to protect a vehicle occupant in the event of a vehicle collision and/or rollover.

BACKGROUND OF THE INVENTION

It is known to inflate a vehicle occupant protection device to help protect a vehicle occupant in the event of a vehicle collision. A side curtain that is inflatable from the roof of a vehicle downward inside the passenger compartment between a vehicle occupant and the side structure of the vehicle in the event of a side impact or rollover is also known. Such side curtains are inflated from a deflated condition by inflation fluid directed from an inflator to the side curtain through a fill tube.

SUMMARY OF THE INVENTION

The present invention relates to an apparatus for helping to protect an occupant of a vehicle which has a side structure. The apparatus includes an inflatable vehicle occupant protection device that has an inflated condition located between the side structure of the vehicle and a vehicle occupant. When in the inflated condition, the vehicle occupant protection device has a given length measured in the direction of vehicle travel. The length of the vehicle occupant protection device increases as measured in the direction of vehicle travel as the vehicle occupant protection device deflates from the inflated condition to a deflated condition.

A first spring connector connects the vehicle occupant protection device to the vehicle. The first spring connector applies force to the vehicle occupant protection device as it deflates and maintains tension in the deflating vehicle occupant protection device throughout the duration of the vehicle collision and/or rollover.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view of a vehicle occupant protection device in a deflated and stored condition in accordance with an embodiment of the present invention;

FIG. 2 is a schematic view of the vehicle occupant protection device of FIG. 1 in an inflated condition; and FIG. 3 is a schematic view of the vehicle occupant protection device of FIG. 2 in a deflated condition after inflation.

DESCRIPTION OF PREFERRED EMBODIMENTS

As representative of the present invention, an apparatus 10 for helping to protect an occupant of a vehicle includes a vehicle occupant protection device. As shown in FIGS. 1–3, the vehicle occupant protection device comprises an inflatable side curtain 14 mounted adjacent to the side structure 16 of the vehicle 12 and the vehicle roof 18. The side structure 16 of the vehicle 12 includes side windows 20, an A pillar 22, a B pillar 24 and a C pillar 26. An inflator 30 is connected in fluid communication with the side curtain 14 through a fill tube 32.

The fill tube 32 has a first end portion 34 for receiving fluid from the inflator 30. The fill tube 32 has a second end portion 36 which is disposed in the side curtain 14. The second end portion 36 of the fill tube 32 has a plurality of openings (not shown) that provide fluid communication between the fill tube 32 and the side curtain 14.

The inflator 30 preferably contains a stored quantity of pressurized inflation fluid (not shown) in the form of a gas to inflate the side curtain 14. The inflator 30 alternatively could contain a combination of pressurized inflation fluid and ignitable material for heating the inflation fluid, or could be a pyrotechnic inflator which uses the combustion of gas-generating material to generate inflation fluid.

The side curtain 14 includes a first portion 50 and a second portion 70 spaced apart in the vehicle 12. A first spring connector 52 connects the first portion 50 of the side curtain 14 to the side structure 16 of the vehicle 12 at a location designated 54 near or on the A pillar 22 of the vehicle 12. A first tether 60 connects the first portion 50 of the side curtain 14 to the side structure 16 of the vehicle 12 at a location designated 62 near or at the location 54. A second spring connector 72 connects second portion 70 of the side curtain 14 to the side structure 16 of the vehicle 12 at a location designated 74 near or on the C pillar 26 of the vehicle 12. A second tether 80 connects the second portion 70 of the side curtain 14 to the side structure 16 of the vehicle 12 at a location designated 82 near or at the location 74.

In the illustrated embodiment, the first and second spring connectors 52 and 72 comprise tension springs. However, alternative resilient devices, such as elastic straps, could be used.

A housing 40 (FIG. 1) encloses and stores the side curtain 14 in a deflated condition. The fill tube 32, the deflated side curtain 14, and the housing 40 have an elongated configuration and extend along the vehicle roof 18 and along the side structure 16 of the vehicle 12 above the side windows 20. In the deflated condition of FIG. 1, the length of the side curtain 14 is such that the first and second spring connectors 52 and 72 and the first and second tethers 60 and 80 are not tensioned.

The vehicle 12 includes a sensor mechanism 100 (shown schematically in FIGS. 1–3) for sensing a side impact to the vehicle 12 and/or a rollover of the vehicle 12. In the event of a rollover of the vehicle or a side impact to the vehicle 12 of a magnitude greater than a predetermined threshold value, the sensor mechanism 100 provides an electrical signal over lead wires 102 to the inflator 30. The electrical signal causes the inflator 30 to be actuated in a known manner. The inflator 30 discharges fluid under pressure into the fill tube 32. The fill tube 32 directs the fluid into the side curtain 14.

When the side curtain 14 inflates under the pressure of the inflation fluid from the inflator 30, the housing 40 opens and the side curtain 14 inflates downward between the side structure 16 of the vehicle 12 and any occupant of the vehicle. During inflation, the side curtain 14 expands laterally (in a direction perpendicular to the plane of the paper in FIG. 2). The expansion causes the length of the side curtain 14 as measured in the direction of vehicle travel to shorten from the length of the side curtain 14 in the deflated and stored condition (FIG. 1).

In the inflated condition of FIG. 2, the side curtain 14 has a given length as measured in the direction of vehicle travel. The length of the inflated side curtain 14 is such that the first and second spring connectors 52 and 72 are extended against their spring bias between the side curtain 14 and the locations 54 and 74, respectively, on the side structure 16 of the vehicle 12. The first spring connector 52 applies a force to the side curtain 14 in a first direction toward the location 54. The second spring connector 72 applies a force to the side curtain 14 toward the location 74 in a second direction opposite the first direction. Thus, the inflated side curtain 14 is tensioned in first and second directions by the first and second spring connectors 52 and 72 between the locations 54 and 74 on the side structure 16 of the vehicle 12.

In the inflated condition, the length of the inflated side curtain 14 as measured in the direction of vehicle travel is such that the first and second tethers 60 and 80 are drawn taut between the side curtain 14 and the locations 62 and 82, respectively, on the side structure 16 of the vehicle 12. The first tether 60 helps to limit the degree to which the first spring connector 52 can be extended against its spring bias, and the second tether 80 helps to limit the degree to which the second spring connector 72 can be extended against its spring bias.

Once inflated, the side curtain 14 begins to deflate to the deflated condition illustrated in FIG. 3. As the side curtain 14 deflates, the length of the side curtain 14 increases as measured in the direction of vehicle travel. As the length of the side curtain 14 increases, the first and second spring connectors 52 and 72 continue to apply respective forces to the side curtain 14 that maintain tension on the side curtain 14. When the side curtain 14 is deflated, the first and second spring connectors 52 and 72 maintain tension on the side curtain 14. Thus, the first and second spring connectors 52 and 72 help maintain the position of the side curtain 14 between any occupant of the vehicle 12 and the side structure 16 of the vehicle 12 throughout the duration of the vehicle collision and/or rollover.

In the illustrated embodiment, first and second spring connectors 52 and 72 apply opposing forces that tension the side curtain 14 between the locations 54 and 74 on the side structure 16 of the vehicle 12. It should be realized, however, that a single spring connector could tension the side curtain 14 without negatively affecting the operation of the apparatus 10. Such a single spring connector could connect either the first portion 50 of the side curtain 14 to the location 54 or the second portion 70 of the side curtain 14 to the location 74. The single spring connector would apply a force in a single direction that would tension the side curtain 14.

In the illustrated embodiment, the first and second spring connectors 52 and 72 and first and second tethers 60 and 80 are used to support and tension a vehicle occupant protection device in the form of an inflatable side curtain 14. It should be realized, however, that the first and second spring connectors 52 and 72 and first and second tethers 60 and 80 could be used to support and tension a vehicle occupant protection device of a different configuration, such as an inflatable tube.

In the illustrated embodiment, the side curtain 14 extends between locations on or near the A pillar 22 and the C pillar 26 of the vehicle 12. The side curtain 14 could alternatively extend between the A pillar 22 and the B pillar 24 of the vehicle 12 or between the B pillar and the C pillar 26 of the vehicle 12.

From the above description of the invention, those skilled in the art will perceive improvements, changes and modifications. Such improvements, changes and modifications within the skill of the art are intended to be covered by the appended claims.

Having described the invention, the following is claimed:

1. In a vehicle having a side structure, a vehicle occupant protection device having an inflated condition wherein said vehicle occupant protection device extends along a side structure of the vehicle between the side structure of the vehicle and a vehicle occupant, said vehicle occupant protection device when in said inflated condition having a length measured along the vehicle side structure in a direction of vehicle travel;

a first spring connector connected to said vehicle occupant protection device, said first spring connector connecting said vehicle occupant protection device to the vehicle, said first spring connector acting to apply force to said vehicle occupant protection device in a direction of vehicle travel when said vehicle occupant protection device is in said inflated condition; and a first tether connected to said vehicle occupant protection device, said first tether connecting said vehicle occupant protection device to the vehicle;

said vehicle occupant protection device deflating from said inflated condition to a deflated condition, the length of said vehicle occupant protection device measured along the vehicle side structure in the direction of vehicle travel increasing as said vehicle occupant protection device deflates from said inflated condition, said first spring connector applying force to said vehicle occupant protection device as said vehicle occupant protection device deflates to maintain tension in said deflating vehicle occupant protection device along the vehicle side structure.

2. Apparatus as defined in claim 1, wherein said vehicle occupant protection device when in said inflated condition has first and second portions spaced apart along the length of the vehicle occupant protection device, said first spring connector connecting said first portion to the vehicle and applying force to said first portion in a direction of vehicle travel.

3. Apparatus as defined in claim 2, further including a second spring connector connected to said second portion of said vehicle occupant protection device, said second spring connector connecting said vehicle occupant protection device to the vehicle and applying force to said second portion in a direction of vehicle travel.

4. Apparatus as defined in claim 3, further comprising a second tether connected to said second portion of said vehicle occupant protection device and being free from connection to said second spring connector, said second tether connecting said vehicle occupant protection device to the vehicle.

5. Apparatus as defined in claim 3, wherein said second spring connector is untensioned prior to inflation of said vehicle occupant protection device.

6. Apparatus as defined in claim 3, wherein said second spring connector is extended by said vehicle occupant protection device when said vehicle occupant protection device is inflated.

7. Apparatus as defined in claim 3, wherein said second spring connector and said second tether connect said vehicle occupant protection device to a C pillar of the vehicle.

8. Apparatus as defined in claim 3, wherein said second spring connector and a second tether are connected to said vehicle occupant protection device at a location on said second portion of said vehicle occupant protection device.

9. Apparatus as defined in claim 1, wherein said first spring connector is untensioned prior to inflation of said vehicle occupant protection device.

10. Apparatus as defined in claim 1, wherein said first spring connector is extended by said vehicle occupant protection device when said vehicle occupant protection device is inflated.

11. Apparatus as defined in claim 1, wherein said first spring connector and said first tether connect said vehicle occupant protection device to an A pillar of the vehicle.

12. Apparatus as defined in claim 1, wherein said first spring connector and said first tether are connected to said vehicle occupant protection device at a first location on said first portion of said vehicle occupant protection device.

* * * * *